United States Patent
van der Werff et al.

[19]

[11] Patent Number: 5,962,627
[45] Date of Patent: Oct. 5, 1999

[54] OPTICALLY ANISOTROPIC SPINNING SOLUTION COMPRISING A MIXTURE OF P-ARAMID AND ALIPHATIC POLYAMIDE, AND FIBERS TO BE MADE THEREFROM

[75] Inventors: Harm van der Werff, Ede; Johannes Marinus Surquin, Arnhem, both of Netherlands

[73] Assignee: Akzo Nobel N.V., Arnhem, Netherlands

[21] Appl. No.: 08/844,820

[22] Filed: Apr. 22, 1997

Related U.S. Application Data

[63] Continuation-in-part of application No. PCT/EP97/00761, Feb. 17, 1997
[60] Provisional application No. 60/016,146, Apr. 22, 1996.

[30] Foreign Application Priority Data

Mar. 4, 1996 [NL] Netherlands .......................... 1005213

[51] Int. Cl.$^6$ .......................... C08G 69/32; C08L 77/10; D01F 6/90
[52] U.S. Cl. .......................... 528/310; 528/322; 528/332; 528/335; 528/338; 528/339; 528/348; 428/395; 428/396; 428/411.1; 428/474.5
[58] Field of Search ..................... 528/310, 338, 528/322, 332, 335, 339, 348; 428/411.1, 474.5, 395, 396

[56] References Cited

U.S. PATENT DOCUMENTS

| | | | |
|---|---|---|---|
| 3,414,645 | 12/1968 | Morgan, Jr. .............................. | 264/210 |
| 4,075,269 | 2/1978 | Jones, Jr. et al. ....................... | 264/184 |
| 4,320,081 | 3/1982 | Lammers ................................. | 264/184 |
| 4,698,414 | 10/1987 | Bair ........................................ | 528/339 |
| 5,177,175 | 1/1993 | Kiriyama et al. ........................ | 528/183 |
| 5,310,861 | 5/1994 | Irwin ...................................... | 528/339 |

FOREIGN PATENT DOCUMENTS

| | | | |
|---|---|---|---|
| 248458 | 12/1987 | European Pat. Off. .......... | D01F 6/90 |
| 392558 | 10/1990 | European Pat. Off. .......... | D01F 6/90 |
| 57-115452 | 7/1982 | Japan .............................. | C08L 77/00 |
| 59-163418 | 9/1984 | Japan . | |
| 118367/1998 | 5/1988 | Japan .............................. | C08L 77/00 |
| 7904495 | 12/1980 | Netherlands ...................... | D01F 6/60 |
| 2008598 | 6/1979 | United Kingdom . | |

OTHER PUBLICATIONS

Derwent Patent Abstract 82–10166J (1982) The Month in the Date of Publication is Not Available.
Derwent Patent Abstract 84–204017 (1984) The Month in the Date of Publication is Not Available.
Research Disclosure No. 23204 (Aug. 1983) The Month in the Date of Publication is Not Available.
ASTM Test Method D 4393–94 The Date of Publication is Not Available.
ASTM Test Method D 1907–89 The Date of Publication is Not Available.
ASTM Test Method D 2256–95a The Date of Publication is Not Available.
ASTM Test Method D 885M–94 The date of Publication is Not Available.
Derwent Patent Abstract 84–266791 (1984) The Month in the Date of Publication is Not Available.

*Primary Examiner*—P. Hampton-Hightower
*Attorney, Agent, or Firm*—Oliff & Berridge, PLC

[57] ABSTRACT

It has been found that fibers which incorporate very good mechanical properties as well as very good adhesive properties can be made from an optically anisotropic spinning solution containing a mixture of a paraphenylene groups-containing, wholly aromatic polyamide component and another polyamide component if for the para-aromatic polyamide component full or partial use is made of copolymer in which 2,6-naphthylene units are present in addition to the paraphenylene units and the other polyamide component is an aliphatic polyamide. Preferably, the weight ratio of the para-aromatic polyamide component to the aliphatic polyamide component is 95:5 to 85:15. The aromatic copolyamide containing paraphenylene and 2,6-naphthylene is preferably obtained by polymerising paraphenylene diamine (PPD) and a stoichiometric amount of a mixture composed of terephthalic acid dichloride (TDC) and 2,6-naphthylene carboxylic acid dichloride (NDC) in a molar ratio TDC:NDC of 99:1 to 80:20.

13 Claims, No Drawings

OPTICALLY ANISOTROPIC SPINNING SOLUTION COMPRISING A MIXTURE OF P-ARAMID AND ALIPHATIC POLYAMIDE, AND FIBERS TO BE MADE THEREFROM

CROSS-REFERENCE TO RELATED APPLICATION

This is a continuation application which claims the benefit of PCT/EP97/00761, filed Feb. 17, 1997 and which also claims the benefit of U.S. Provisional Application Ser. No. 60/016,146.

BACKGROUND OF THE INVENTION

The invention pertains to an optically anisotropic solution containing a mixture of a paraphenylene groups-containing, wholly aromatic polyamide component and another polyamide component in a suitable solvent such as concentrated sulphuric acid. The invention also pertains to fibers made up wholly or for the most part of a mixture of a para-aromatic polyamide component (p-aramid) and some other polyamide component, which are to be made by spinning the solution in a conventional manner.

Such solutions, and fibers made therefrom, are known from JP 57-183 420, which describes a spinning solution of a mixture comprising 55 to 95 wt. % of para-aromatic polyamide, and 5 to 45 wt. % of some other polyamide. A number of feasible para-aromatic polyamides are listed, as is a wide range of other polyamides. The embodiments concern fibers made from spinning solutions of polyparaphenylene terephthalamide (PPTA) and N-modified PPTA (N-carboxymethyl PPTA and N-propyl PPTA), i.e., both polyamides are p-aromatic polyamides.

Especially because of the adhesion of p-aramid to rubber it is desired that the aramid should be miscible with an aliphatic polyamide. This is known, e.g., from JP 59/116411, wherein a polyamide fiber is described which has a strong rubber adhesion, made up of 97–100 wt. % PPTA and 0–3 wt. % of an aliphatic polyamide. However, as is also apparent from the relatively low single filament strengths mentioned, it was found that the addition of an aliphatic polyamide to a PPTA spinning solution produces a dramatic deterioration of the mechanical properties of the resulting yarns. More in particular, yarns made from such a spinning solution were found to have low breaking strength, low loop strength, and low cord efficiency.

The invention has for its object to provide fibers, and notably multifilament yarns, with better adhesion to rubber than corresponding fibers and filament yarns of PPTA, but also with mechanical properties which are not actually inferior to those of PPTA and preferably at least comparable.

The prior art concerning mixtures of aromatic and aliphatic polyamide includes JP 57-115,452. From this document hot melt-formable polyamide compositions are known. The disclosed compositions comprise a hot melt-formable, aromatic group-containing polyamide and a wholly aromatic polyamide. It is noted that an aliphatic polyamide may be added thereto. In addition, the description makes mention of a solution of nylon-66 and PPTA in 98% sulphuric acid. This is not a spinning solution. The dissolving of the polyamides, with the polymer content in the solution being a mere 5%, serves to arrive at a properly mixed composition. To this end the sulphuric solution is poured into water, washed, and dried, followed by the mixture being hot melt-formed. From JP 57-115,452 melt-spun fibers are known which are made up of a mixture of meta-aramid and aliphatic polyamide.

Mixtures of aromatic and aliphatic polyamide are also known from GB 2,008,598. This publication does not pertain to fiber spinning, but to the preparation of a polymer composite material.

Additional background literature is constituted by the following publications. JP 118367/1988 teaches a resin composition comprising a polyamide resin composed of an aromatic polyamide and polyamide-6,6. From JP 59/163418 another fibrous product made from a spinning solution of PPTA and an aliphatic polyamide is known, viz. a fibrillated fiber that can be made into paper. Further, EP 392 558 teaches spinnable dopes containing a mixture of fiber-forming polymers, one of which, in 55–80%, being para-aramid, the other, 20–45%, being a thermally consolidatable polymer. Rather than pertaining to an anisotropic spinning solution such as is normally required for making industrial fibers of sufficient strength, the disclosure prescribes that the spinning solution be a two-phase solution comprising interdispersed anisotropic and isotropic phases.

BRIEF SUMMARY OF THE INVENTION

The invention pertains to an anisotropic solution of p-aramid from which fibers having the corresponding good physical and mechanical properties can be made in the conventional manner, with improved adhesion to rubber being obtained in the process.

DETAILED DESCRIPTION OF THE INVENTION

To this end, the invention consists in that in a solution of the known type mentioned in the opening paragraph the para-aromatic polyamide component comprises a copolymer in which in addition to paraphenylene units 2,6-naphthylene units are present, while the other polyamide component comprises an aliphatic polyamide.

Such a copolymer containing 2,6-naphthylene units and p-phenylene units is known in itself from U.S. Pat. No. 4,698,414 and EP 248 458. The latter publication also discloses the incorporation of the copolymer into a mixture, i.e., to mix it with PPTA. When manufacturing fibers according to the present invention for the aromatic polyamide component use may be made of, for example, the copolymers containing 2,6-naphthalamide units known from these publications and mixtures of PPTA and these copolymers. The descriptions of U.S. Pat. No. 4,698,414 and EP 248 458 are hereby incorporated by reference.

Preferably, the para-aromatic polyamide component is made up wholly or principally of the p-phenylene and 2,6-naphthylene groups-containing aromatic copolyamide. In that case the weight ratio of the para-aromatic polyamide component to the aliphatic polyamide component is 99:1 or less, preferably 95:5 to 85:15.

The paraphenylene and 2,6-naphthylene-containing aromatic copolyamide is preferably obtained by means of the polymerisation, in an appropriate solvent, of paraphenylene diamine (PPD) and a stoichiometric amount of a para-aromatic dicarboxylic acid dichloride mixture, with the dicarboxylic acid dichloride mixture consisting of terephthalic acid dichloride (TDC) and 2,6-naphthylene carboxylic acid dichloride (NDC) in a molar ratio TDC:NDC of 99:1 to 80:20. One example of a suitable solvent is N-methyl pyrrolidone containing at least 5 wt. % of calcium chloride. The copolyamide should have sufficient viscosity to make fibers, which means a relative viscosity $\eta_{rel}$ of at least 3.5 and preferably more than 4.0. The relative viscosity of the copolyamide is defined as the ratio of the outflow periods of a solution of the polyamide (0.25 g of polyamide in 100 ml of 96 wt. % sulphuric acid) to the pure solvent measured in a capillary viscometer at 25° C.

In principle, the aliphatic polyamide component may comprise any aliphatic polyamide. Aliphatic polyamides which are pre-eminently suitable for use include polyamide-6; polyamide 6,6; polyamide 4,6.

The anisotropic solution preferably contains about 17.0–20.5 wt. % of the polymeric mixture dissolved in an appropriate solvent such as concentrated sulphuric acid. Preferably, 96 to 102% of sulphuric acid is employed. Such anisotropic solutions are fully known for p-aramid in general and PPTA in particular. The spinning solutions according to the present invention can be prepared in an analogous manner, e.g., using a freezing process such as disclosed in laid-open Netherlands patent application 7904495. The aliphatic polyamide can be mixed with PPTA, whereupon the mixture can be added to the glacial sulphuric acid used therein.

The invention also pertains to fibers to be made by spinning the solutions described above in a conventional manner. The resulting fibers are made up wholly or principally of a mixture of the para-aromatic polyamide component comprising the paraphenylene and 2,6-naphthalene units-containing copolymer, as well as the aliphatic polyamide component.

Manufacturing such fibers comprises a spinning process which is common for p-aramid. Such processes are known to the skilled person and require no further elucidation here. One such suitable process is an airgap-wet spinning process as known from U.S. Pat. No. 4,320,081.

The presence of the aliphatic component does not have any essential effect on the anisotropic solution's preparation and spinning as long as not more than 10 wt. % of the aliphatic polyamide is present. In the case of higher percentages spinning of aliphatic polyamide is still feasible, but when a freezing process is used, the dosing may be complicated by the spinning solution caking together. It is recommended for such higher percentages to mix and crumble the chilled solution extra thoroughly. Alternatively, use may be made of a process which does not employ glacial sulphuric acid, e.g., as described in RD 232 004.

Generally, in a spinning process such as envisaged above, endless filaments are made which can be joined together in a known manner to form a filament yarn, or which can be made into staple fibers or other types of short fibers (e.g., by cutting up filament yarn), which fibers can be spun into a spun yarn in a known manner. Within the framework of the present invention the term "fiber" in this connection refers to all possible types of fibers irrespective of length, including staple fibers and endless filaments.

The fibers according to the invention can be used in any known manner, but are preferably employed in multifilament yarn. More preferably, this yarn, in the form of a twisted cord, is used in rubber articles which can be subjected to mechanical load such as drive belts, vee-belts, toothed belts, conveyor belts or vehicle tires. In general, to improve its adhesion to rubber, the yarn or cord is coated with an adhesion promoter, e.g., a resorcinol formaldehyde latex (the "RFL dip" well-known to the skilled person). This will lead to the yarns according to the invention having improved adhesion, with the further advantage that the RFL treatment's customary epoxy predip may be omitted.

In a matrix, e.g., rubber, the fibers according to the present invention also can be present in other than the cord form, for instance as woven fabric, knitted fabric, non-woven web or braid.

The invention will be elucidated with reference to the following unlimitative Examples below.

EXAMPLE I (a)–(g)

A PPD/TDC/NDC copolymer containing 10 mole % of NDC was prepared in a manner analogous to that described in EP 248 458. PPD was dissolved in an NMP/CaCl$_2$ suspension and discharged into a reactor vessel of 2500 l. Following cooling of the PPD-solution to 5° C. solid NDC was metered into the reactor, after which straightaway liquid TDC was dosed. The polymerization reaction was carried out under the following conditions:

calcium chloride content in NMP/CaCl$_2$: 11.5 wt. %;
water content in NMP/CaCl$_2$: 400 ppm;
molar ratio PPD/(TDC+NDC): 0.999;
molar ratio NDC/(TDC+NDC): 0.10;
monomer concentration: 12.3 wt. %;
filling level of the reaction vessel: 44%;
TDC dosing time: 120 s;
rotational speed of the reactor's mixing device: 145 rpm;

After 30 minutes the reaction product was coagulated and then washed with demineralized water. After drying to a moisture content of less than 1% a relative viscosity of 5.07 was measured on the polymer.

Aliphatic copolyamide 66/6 (ratio 90/10) was prepared in a manner analogous to the conventional preparative process for polyamide 66 by the polycondensation of 5.9 kg of caprolactam with 50 kg of commercially available nylon salt (the hexamethylene diamine salt of adipic acid) in an autoclave at a reactor temperature of 305° C. and a pressure of 18 bar over 60 minutes, followed by decreasing pressure and reactor temperature for 90 minutes: to 12 bar at 285° C., to 6 bar at 275° C. Obtained was a copolyamide having a relative viscosity of 2.35 (converted to formic acid). It was dried at 90° C. and then subjected to postcondensation for 12 hours. The resulting copolyamide 66/6 had a relative viscosity of 3.16 (converted to formic acid).

A solution of 100 kg of the PPD/TDC/NDC copolymer in 421 kg 99.8% sulphuric acid, having a relative viscosity of 5.07, and 5.3 kg of the aliphatic copolyamide was spun into yarn. The solution accordingly contained 19.0 wt. % of para-aromatic NDC copolyamide and 1.0 wt. % of aliphatic copolyamide. Spinning took place via a conventional air gap-wet spinning process: the solution was extruded through a spinneret with 1000 spinning orifices of 65 μm in diameter via an air gap of 8 mm into an aqueous spinning bath containing a small quantity of concentrated sulphuric acid, followed by the usual pre-wash, neutralisation, post-wash, and drying treatments known to the skilled person. Examples (a), (b), and (c) concern an embodiment having an acid concentration in the bath of 20% and different spinning rates. Examples (d) and (e) have the same acid concentration in the bath and the same spinning rate, with different drying conditions. Examples (f) and (g) have different spinning rates at an acid concentration in the bath of 5%. The properties measured on the spun yarn are listed in TABLE I.

COMPARATIVE EXAMPLE I (a')–(g')

A solution in 421 kg of 99.8% sulphuric acid of 100 kg of Twaron® PPTA having a relative viscosity of 4.70 and 5.3 kg of the aliphatic copolyamide 6.6/6 described above was spun into yarn by means of the same air gap-wet spinning process as in the examples above. In Examples (a') to (g') the spinning rate, the acid concentration in the bath, and the drying conditions were varied in the same way as in the corresponding examples (a) to (g). The properties measured on the spun yarn are listed in TABLE I.

The properties listed in TABLE I were determined as follows:

Linear Density LD (Linear Density of Yarn, Greige Cord, and Dipped Cord)

In accordance with ASTM D 885 M-85; Standard Methods of Testing Tire Cords, Tire Cord Fabrics, and Industrial Filament Yarns, made from manmade organic-base fibers.

Deviation: standard atmosphere: 20±2° C. and 65±2% R.H., instead of 24±1° C., and 55±2% R.H.

Test Conditions:

Yarn: in accordance with option 1 of ASTM D1907-89; Standard Test Method for yarn number by skein method. Number of measurements per bobbin: 3. The measurements were carried out on twisted yarn (Z90).

Dipped cord: the measured dipped cord linear density (LD not corrected DPU) is corrected for dip pick-up as follows:

LD=100×$LD_{nc}$/[100+DPU], wherein $LD_{nc}$ stands for "LD not corrected DPU."

Mechanical (Tensile) Properties (Yarn, Greige Cord, and Dipped Cord)

Measurement of breaking strength (BS), EAB, FASE (modulus), and CM (chord modulus)

In accordance with ASTM D885M-85; Standard Methods of Testing Tire Cords, Tire Cord Fabrics, and Industrial Filament Yarns, made from manmade organic-base fibers. Deviations: standard atmosphere: 20±2° C. and 65±2% R.H., instead of 24±1° C. and 55±2% R.H. and pre-tension: 20 mN/tex, instead of 5 mN/tex.

Test Conditions:

Protective twist (yarn) 90 tpm; tensile tester: CRE-type, clamps: Instron 4D (cat. no. 2714-006); gauge length: 500 mm; drawing speed: 50 mm/min (10% of the gauge length); number of measurements per bobbin: 15 (3 measuring series of 5 measurements); chord modulus (CM): interval 200–400 mN/tex.

Loop Strength LBS

In accordance with ASTM 2256-90; Standard Test Method for Tensile Properties of Yarns by the single-strand Method, option C1. Deviation: time to break about. 12s, instead of the specified 20±3s.

| Test conditions: | |
|---|---|
| standard: | 20 ± 2° C. and 65 ± 2% R.H. |
| protective twist: | 90 tpm |
| tensile tester: | Instron 4500-series, CRE-type |
| clamps: | Instron 4D (2714-006) |
| gauge length: | 500 mm |
| drawing speed: | 50 mm/min |
| no. of measurements per bobbin: | 15 (3 measuring series of 5) |

Dipped Cord (Dipping Conditions and Specific Measurements) Adhision

In accordance with ASTM D4393-94, Standard Test method for strap Peel adhesion of Reinforcing Cords or Fabrics to Rubber Compounds: section 4.1 strap peel adhesion from single cord.

| Test conditions: | |
|---|---|
| cord structure: | 1680 dtex × 1 Z90 × 1 Z240 × × S330 |
| dip: | standard RFL with a styrene-butadiene-vinyl pridine terpolymer as latex component |
| strap peel adhesion test of test specimens (per mould 12 test specimens are prepared) | |
| dimensions: | L = 11 ± 0.5 cm |
| | W = 2 cm |
| structure: | rubber-cord-rubber-cord-rubber |
| thickness of intermediate layer: | 1 mm (rubber) |
| rubber: | test rubber compounds, sulphur-vulcanised on the basis of natural rubber; |
| curing conditions: | temperature 150° C. |
| | pressure about 1.6 Mpa |
| | time 15 minutes |
| measurement of strap peel force: | in accordance with ASTM D4393-85 option 3, section 11.1 |
| tensile tester: | Instron, CRE-type |
| drawing speed: | 100 mm/min |
| tested in standard atmosphere: | 20 ± 2° C., 65 ± 2% R.H. |

TABLE 1

| Ex. no. | Vspin m/min | acid conc. in bath % | break. str.* mN/tex | linear density yarn dTex | EAB* % | ASTM* modul. GPa | Loop str.* mN/tex | LBSR** % |
|---|---|---|---|---|---|---|---|---|
| a | 300 | 20 | 1854 | 1720 | 3.48 | 80.3 | 921 | 49.7 |
| a | 300 | 20 | 1912 | 1707 | 3.55 | 81.6 | 909 | 47.5 |
| a' | 300 | 20 | 1195 | 1718 | 2.81 | 57.7 | 312 | 26.1 |
| b | 400 | 20 | 1778 | 1712 | 3.38 | 79.0 | 897 | 50.4 |
| b | 400 | 20 | 1735 | 1710 | 3.29 | 78.4 | 889 | 51.2 |
| b' | 400 | 20 | 1293 | 1717 | 2.74 | 64.6 | 366 | 28.3 |
| c | 500 | 20 | 1618 | 1714 | 3.09 | 78.3 | 854 | 52.8 |
| c | 500 | 20 | 1599 | 1714 | 3.07 | 78.0 | 865 | 54.1 |
| c' | 500 | 20 | 1360 | 1704 | 2.64 | 71.3 | 413 | 30.4 |
| d | 250 | 5[1] | 1867 | 1727 | 3.66 | 79.4 | 928 | 49.7 |
| d | 250 | 5[1] | 1879 | 1724 | 3.75 | 77.7 | 941 | 50.1 |
| d' | 250 | 5[1] | 1120 | 1722 | 2.92 | 47.8 | 288 | 25.7 |
| d' | 250 | 5[1] | 1195 | 1719 | 3.00 | 49.5 | 309 | 25.9 |

TABLE 1-continued

| Ex. no. | Vspin m/min | acid conc. in bath % | break. str.* mN/tex | linear density yarn dTex | EAB* % | ASTM* modul. GPa | Loop str.* mN/tex | LBSR** % |
|---|---|---|---|---|---|---|---|---|
| e | 250 | $5^2$ | 1858 | 1737 | 3.58 | 81.9 | 950 | 51.1 |
| e | 250 | $5^2$ | 1909 | 1719 | 3.73 | 80.4 | 938 | 49.1 |
| e' | 250 | $5^2$ | 1173 | 1719 | 2.86 | 54.3 | 284 | 24.2 |
| e' | 250 | $5^2$ | 1207 | 1721 | 2.88 | 55.0 | 297 | 24.6 |
| f | 300 | 5 | 1742 | 1715 | 3.42 | 75.5 | 831 | 47.7 |
| f | 300 | 5 | 1831 | 1710 | 3.49 | 79.4 | 836 | 45.7 |
| f' | 300 | 5 | 1257 | 1707 | 2.14 | 85.5 | 248 | 19.7 |
| f' | 300 | 5 | 1314 | 1703 | 2.17 | 87.7 | 263 | 20.0 |
| g | 400 | 5 | 1638 | 1711 | 3.25 | 74.6 | 846 | 51.6 |
| g | 400 | 5 | 1704 | 1716 | 3.29 | 77.3 | 821 | 48.2 |
| g' | 400 | 5 | 1193 | 1725 | 2.60 | 63.6 | 301 | 25.2 |
| g' | 400 | 5 | 1262 | 1723 | 2.63 | 66.1 | 313 | 24.8 |

[1]drying conditions: six wraps a drying roll (diameter: 750 mm) at 120° C. at a drying force of 50 cN
[2]drying conditions: same as footnote 1 except the drying force was 400 cN.
*determined in accordance with ASTM D885M-85.
**Loop strength LBS and LSBR ("Loop Breaking Strength Ratio") determined in accordance with ASTM 2256-90.

EXAMPLE II

This Example concerns the adhesion to rubber of cord comprising yarn made from a spinning solution according to the present invention, and a comparison of this cord with PPTA. The results are listed in Table II, where "NDC-co" stands for the copolymer according to the invention and "PA" stands for copolyamide 66/6.

TABLE II

|  | PPTA | NDC-co | PPTA + PA | NDC-co + PA |
|---|---|---|---|---|
| YARN |  |  |  |  |
| strength (mN/tex) | 1969 | 2106 | 1150 | 1960 |
| linear density (dtex) | 1741 | 1703 | 1715 | 1704 |
| EAB (%) | 3.64 | 3.87 | 2.81 | 3.82 |
| modulus CM (Gpa) | 65 | 82 | 57 | 81 |
| Loop LBSR (%) | 44 | 48 | 28 | 46 |
| GREIGE CORD |  |  |  |  |
| strength (mN/tex) | 1490 | 1790 | 690 | 1610 |
| linear density (dtex) | 3728 | 3656 | 3687 | 3669 |
| twist effect abs. (%) | 81 | 91 | 64 | 89 |
| DIPPED CORD 1-bath dip |  |  |  |  |
| strength (mN/tex) | 1550 | 1809 | 670 | 1720 |
| linear density (dtex) | 3578 | 3588 | 3510 | 3560 |
| twist effect abs. (%) | 81 | 90 | 60 | 92 |
| adhesion SPF (N/cm$^2$) | 93 | not determined | 221 | 224 |

Among other things, the examples show that the addition of aliphatic polyamide to PPTA produces such adhesion promotion that good adhesion to rubber is obtained with a 1-bath dip (RFL), but that compared with PPTA low strengths and low yields are obtained. The spinning solution according to the present invention provides adhesion promoting yarn products which also have excellent properties and produce excellent yields.

We claim:

1. An optically anisotropic spinning solution containing a mixture of a paraphenylene groups-containing, a para-aromatic polyamide component and another polyamide component, wherein the para-aromatic polyamide component comprises a copolymer in which, in addition to paraphenylene dicarbonyl units, 2,6-naphthylene dicarbonyl units are present, and the other polyamide component comprises an aliphatic polyamide.

2. A spinning solution according to claim 1, wherein the 2,6-naphthylene dicarbonyl units-containing copolymer is made up of paraphenylene diamine (PPD) and a stoichiometric amount of a para-aromatic dicarboxylic acid dichloride mixture, with the dicarboxylic acid dichloride mixture being composed of terephthalic acid dichloride (TDC) and 2,6-naphthylene carboxylic acid dichloride (NDC) in a molar ratio TDC:NDC of 99:1 to 80:20.

3. A spinning solution according to claim 1 or 2, wherein the weight ratio of the para-aromatic polyamide component to the aliphatic polyamide component is 95:5 to 85:15.

4. A fiber wholly or essentially composed of a mixture of a para-aromatic polyamide component and another polyamide component, wherein the para-aromatic polyamide component comprises a copolymer in which, in addition to paraphenylene dicarbonyl unit, 2,6-naphthylene dicarbonyl units are present, and the other polyamide component comprises an aliphatic polyamide.

5. A fiber according to claim 4, wherein the 2,6-naphthylene units-containing copolymer is made up of paraphenylene diamine (PPD) and a stoichiometric amount of a para-aromatic dicarboxylic acid dichloride mixture, with the dicarboxylic acid dichloride mixture being composed of terephthalic acid dichloride (TDC) and 2,6-naphthalene carboxylic acid dichloride (NDC) in a molar ratio TDC:NDC of 99:1 to 80:20.

6. A fiber according to claim 4 or 5, wherein the weight ratio of the para-aromatic polyamide component to the aliphatic polyamide component is 95:5 to 85:15.

7. A fiber according to claim 4 or 5, in the form of a continuous filament.

8. A filament yarn comprising a plurality of fibers according to claim 7.

9. A rubber article for being subjected to mechanical load reinforced with a yarn according to claim 8.

10. A cord comprising a yarn according to claim 8.

11. A rubber article for being subjected to mechanical load reinforced with a cord according to claim 10.

12. A process for manufacturing fibers in which a spinning solution in concentrated sulphuric acid comprising a mixture of a para-aromatic polyamide component and another polyamide component is subjected to a conventional wet spinning process, wherein use is made of a spinning solution according to any one of claims 1 or 2.

13. A process according to claim 11, wherein use is made of concentrated sulphuric acid of 96 to 102% and the polymer concentration in the solution is 17–20,5 wt. %.

* * * * *

UNITED STATES PATENT AND TRADEMARK OFFICE
CERTIFICATE OF CORRECTION

PATENT NO. : 5,962,627
DATED : October 5, 1999
INVENTOR(S) : Harm VAN DER WERFF et al.

It is certified that error appears in the above-indentified patent and that said Letters Patent is hereby corrected as shown below:

Col. 6, line 18, change "Adhision" to --Adhesion--.

Signed and Sealed this

Seventh Day of March, 2000

Attest:

Attesting Officer

Q. TODD DICKINSON

Commissioner of Patents and Trademarks